UNITED STATES PATENT OFFICE.

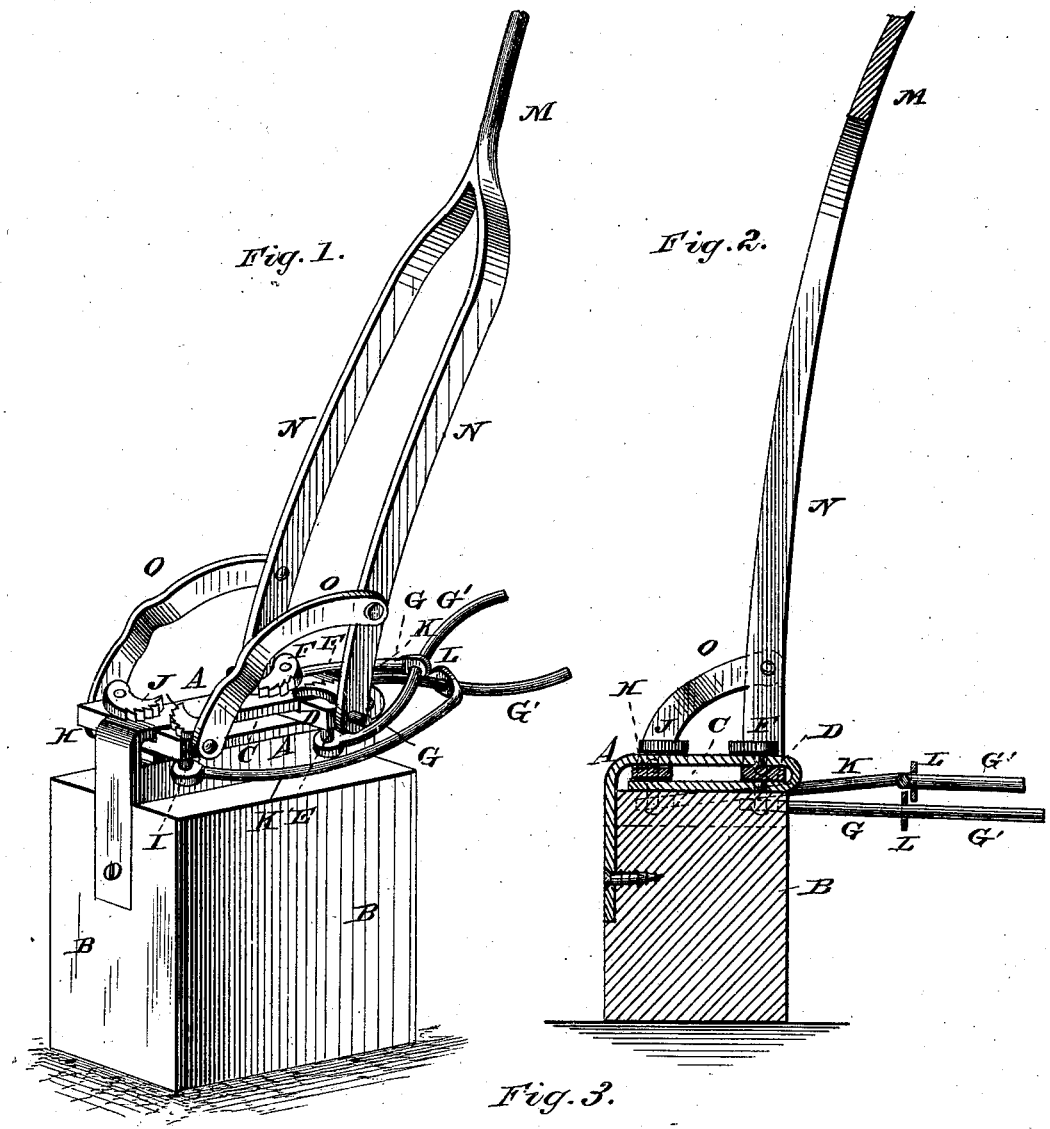

ALEXANDER WOMACK, OF EMMETTVILLE, IDAHO TERRITORY.

TIRE-UPSETTER.

SPECIFICATION forming part of Letters Patent No. 256,528, dated April 18, 1882.

Application filed December 10, 1881. (Model.)

*To all whom it may concern:*

Be it known that I, ALEXANDER WOMACK, of Emmettville, in the county of Ada and Territory of Idaho, have invented certain new and useful Improvements in Machines for Upsetting Tires; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a longitudinal vertical section, and Fig. 3 is a top plan.

Corresponding parts in the several figures are denoted by like letters of reference.

This invention relates to machines for shrinking or upsetting tires; and it consists in certain improvements in the construction of the same, which will be hereinafter fully described, and particularly pointed out in the claims.

In the drawings hereto annexed, A represents the head of the machine, which may be secured in any suitable manner to a block or base, B. The head A may be formed of heavy strap-iron, bent or doubled, as shown, so as to form a horizontal slot, C, at the front end of which a cross-piece, D, is firmly secured. Said cross-piece is provided near its ends with vertical bearings for a pair of short shafts, E, the upper ends of which carry horizontal dogs or cams F, having toothed or serrated faces, so as to be capable of clamping and holding the tire when adjusted in the machine, as will be presently described. At their lower ends the shafts E are provided with forward-extending levers G, by which they may be operated so as to clamp or release the tire.

H is a cross-head, sliding longitudinally in the slot C, and provided near its ends with bearings for a pair of vertical shafts, I I, carrying at their upper ends toothed dogs or cams J, facing the cams F. The lower ends of shafts I have levers K, extending forward and provided at their front ends with eyes or openings L, through which the levers G are passed, as shown, the right-hand lever G through the eye of left-hand lever K, and vice versa. The levers G have handles G'. It will be seen that by operating levers G the dogs or cams F J may be simultaneously operated so as to clamp or release the tire.

M is a forked lever, the arms of which, N, are pivoted upon suitable spindles formed at the ends of cross-piece D. At a short distance from the fulcrum the arms N are connected by pivoted rods O with the ends of the sliding cross-head H, which may thus, by lowering or raising lever M, be slid toward or from the stationary cross-piece D.

The operation of my invention is as follows: The lever M is raised so as to move the cross-head H to the rear end of head A, upon which the tire is then placed and clamped between the cams or dogs F F and J J. By lowering the lever M the head H may then be drawn or forced in the direction of the stationary cross-piece D, thus shrinking or upsetting the tire to the desired extent.

My improved tire-upsetter is exceedingly simple, durable, and easily operated, and it may be made very powerful without being heavy, as most machines now in use for a similar purpose.

Having thus described my invention, I claim and desire to secure by Letters Patent of the United States—

1. The combination of the slotted head A, the sliding cross-head H, the cams or dogs F J, the levers G K, arranged, as herein described, for operating said cams or dogs simultaneously, the forked lever M, and connecting-rods O, all arranged and operating substantially as set forth.

2. In a machine for upsetting tires, the combination of the slotted head A, having cross-piece D, sliding cross-head H, and the shafts E I, having toothed dogs or cams F J, and levers G K, the latter, K, being provided with eyes L, through which the levers G pass, substantially as set forth.

In testimony that I claim the foregoing as my own I have hereto affixed my signature in presence of two witnesses.

ALEXANDER WOMACK.

Witnesses:
JONATHAN H. SMITH,
WILLIAM A. MARTIN.